(12) United States Patent
Kamakura et al.

(10) Patent No.: US 6,429,869 B1
(45) Date of Patent: Aug. 6, 2002

(54) METHOD FOR DISPLAYING BAR GRAPH WITHOUT TOTALING DATA AND PROGRAM STORAGE MEDIUM THEREOF

(75) Inventors: Kazushi Kamakura; Kohei Yoshikawa, both of Nara (JP)

(73) Assignee: Sharp Kabusshiki Kaisha, Osaka (JP)

( * ) Notice: Subject to any disclaimer, the term of this patent is extended or adjusted under 35 U.S.C. 154(b) by 0 days.

(21) Appl. No.: 09/311,256

(22) Filed: May 13, 1999

(30) Foreign Application Priority Data

May 14, 1998 (JP) .......................................... 10-131989

(51) Int. Cl.7 ................................................ G09G 5/36
(52) U.S. Cl. .................................... 345/440.2; 345/440
(58) Field of Search ................................. 345/140, 173, 345/156, 163, 35, 36, 39, 440, 349, 839, 440.2; 340/825.37

(56) References Cited

U.S. PATENT DOCUMENTS

| | | | | |
|---|---|---|---|---|
| 4,853,867 A | * | 8/1989 | Matsumura | 364/474.22 |
| 5,247,287 A | * | 9/1993 | Jonker et al. | 345/134 |
| 5,594,198 A | * | 1/1997 | Ikeda et al. | 399/281 |
| 5,818,428 A | * | 10/1998 | Eisenbrandt et al. | 345/173 |
| 5,844,572 A | * | 12/1998 | Schott | 345/440 |
| 5,999,193 A | * | 12/1999 | Conley, Jr. et al. | 345/440 |
| 5,999,918 A | * | 12/1999 | Williams et al. | 706/36 |
| 6,023,280 A | * | 2/2000 | Becker et al. | 345/440 |
| 6,088,030 A | * | 7/2000 | Bertram et al. | 345/349 |

FOREIGN PATENT DOCUMENTS

JP 5-318285 A 12/1993

* cited by examiner

Primary Examiner—Bipin Shalwala
Assistant Examiner—Mansour M. Said
(74) Attorney, Agent, or Firm—Edwards & Angell, LLP; David C. Conlin; William J. Daley, Jr.

(57) ABSTRACT

There is provided a bar graph displaying method as well as a program storage medium of the method capable of easily displaying a bar graph in which each of bar portions is divided into two regions without requiring a user to perform calculation of totaling a large amount of data. A set of elements having a name attribute, a residence attribute and an age attribute is classified into subsets having no common elements by the residence attribute. Each of the subsets is divided into two regions on the basis of a threshold value of the age attribute, and the bar graph in which the bar portions corresponding to the subsets are each divided is displayed. The threshold value is displayed by the position of a bar arranged on a slider in which a setting range and a unit of the above threshold value are shown. If the bar on the slider is slid to vary the threshold value, then the subsets are each redivided on the basis of the varied threshold value, and the bar graph of the redivided subsets is redisplayed.

15 Claims, 13 Drawing Sheets

Fig.2

| A21 | A22 | A23 |
|---|---|---|
| NOBORU HAYAKAWA | OSAKA PREFECTURE | 68 |
| TOKUJI HIRANO | TOKYO METROPOLITAN AREA | 53 |
| TAROU KOHRIYAMA | NARA PREFECTURE | 19 |
| KAZUE UEDA | KYOTO PREFECTURE | 24 |
| KAZUTOSI TANIMURA | SHIGA PREFECTURE | 48 |
| | | |

Fig.3

| A31 | A32 | A33 |
|---|---|---|
| MIE PREFECTURE | 1,544,073 | 297,129 |
| SHIGA PREFECTURE | 1,105,477 | 181,376 |
| KYOTO PREFECTURE | 2,232,605 | 386,976 |
| OSAKA PREFECTURE | 7,733,420 | 1,047,875 |
| HYOGO PREFECTURE | 4,635,594 | 763,752 |
| NARA PREFECTURE | 1,231,679 | 198,192 |

| PREFECTURE NAME | UNDER AGE 65 | AGE 65 AND OVER |
|---|---:|---:|
| 24 MIE PREFECTURE | 1,544,073 | 297,129 |
| 25 SHIGA PREFECTURE | 1,105,477 | 181,376 |
| 26 KYOTO PREFECTURE | 2,232,605 | 386,976 |
| 27 OSAKA PREFECTURE | 7,733,420 | 1,047,875 |
| 28 HYOGO PREFECTURE | 4,635,594 | 763,752 |
| 29 NARA PREFECTURE | 1,231,679 | 198,192 |

| PREFECTURE NAME | UNDER AGE 15 | AGE 15 AND OVER |
|---|---|---|
| 24 MIE PREFECTURE | 303,645 | 1,537,557 |
| 25 SHIGA PREFECTURE | 231,022 | 1,055,831 |
| 26 KYOTO PREFECTURE | 390,138 | 2,229,443 |
| 27 OSAKA PREFECTURE | 1,321,475 | 7,459,820 |
| 28 HYOGO PREFECTURE | 880,094 | 4,519,252 |
| 29 NARA PREFECTURE | 232,418 | 1,197,453 |

METHOD FOR DISPLAYING BAR GRAPH WITHOUT TOTALING DATA AND PROGRAM STORAGE MEDIUM THEREOF

BACKGROUND OF THE INVENTION

The present invention relates to a bar graph displaying method for displaying a bar graph of statistical data and operating the bar graph in a personal computer or the like and to a program storage medium of the method.

Conventionally, a bar graph has been utilized for visualizing the tendency and distribution of large-scale data comprised of individual information that has a plurality of attributes. For example, FIG. 15 is a table showing the population under age 65 and the population of age 65 and over as the result of a national census, indicated by the districts. The table shows the distribution of the population with regard to the specified age group under 65 and the age group of 65 and over, on the basis of the age attributes owned by the individuals. FIG. 16 shows a bar graph of the contents shown in FIG. 15. Likewise, FIG. 17 shows the population under age 15 and the population of age 15 and over as the result of the national census, indicated by the districts. FIG. 18 shows the distribution of the population with regard to the specified age group under 15 and the age group of 15 and over. The bar graphs of FIG. 16 and FIG. 18 visualize the distributions of ages in the bar graph by the districts while concurrently instinctively displaying the overall tendency, and this is excellent in terms of representation of information.

However, in order to display the bar graph shown in FIG. 16 or FIG. 18, there has been necessitated the procedure of preparatorily executing totaling and averaging by means of table calculation software or functional calculus using the constituent elements of the table as an argument, forming the bar graph making table shown in FIG. 15 or FIG. 17 and then forming the bar graph on the basis of the above table. That is, in order to change the contents of display of FIG. 16 to the contents of display of FIG. 18 or to display the bar graph by an age group other than 15 or 65, there is necessitated the procedure of once restoring the data from the bar graph state into the original tabular format representation to execute again the statistical processing and then remaking the bar graph. Therefore, when representing the properties, tendency and distribution of specified attribute values and the like of a large amount of data by means of a bar graph, it is required to execute an operation on the tabular format and the calculation of the total, average and the like in order to change the display of the bar graph by varying the distribution and component ratio of an identical subject. This has led the problem that the contents of display of the bar graph cannot be changed by directly operating the representation by the bar graph.

SUMMARY OF THE INVENTION

Accordingly, the object of the present invention is to provide a bar graph displaying method capable of easily displaying a bar graph in which the bar portion is divided into two regions without requiring the user to perform calculation of the totaling or the like of a large amount of data as well as a program storage medium of the method.

In order to achieve the above-mentioned object, the present invention provides a bar graph displaying method for classifying a set of elements having a plurality of attributes into subsets having no common part by one attribute among the plurality of attributes and displaying the number of elements of the subsets in the form of a bar graph, comprising the steps of:

dividing each of the subsets into two regions on the basis of a more detailed division condition relevant to the attribute used for classifying the set into the subsets or a division condition relevant to another attribute among the plurality of attributes; and displaying a bar graph in which a bar portion corresponding to each of the subsets is divided.

According to the present invention, a set of elements having a plurality of attributes is classified into subsets having no common part by one attribute out of the plurality of attributes. Then, each subset is divided into two regions on the basis of a more detailed division condition relevant to the attribute used for classifying the set or a division condition relevant to another attribute among the plurality of attributes. For example, a set of data having names, residences and ages as attributes is classified by the residential prefectures, and cities are arranged in the syllabic order by a detailed division condition relevant to the residence attribute used for the classification. By using a specified syllable as a division condition, the classified data (subset) is divided depending on whether its syllable precedes or succeeds the above syllable, or the classified data (subset) is divided by using the age attribute, other than the attribute used for the classification, as a division condition. Then, a bar graph in which the bar portion corresponding to the divided two regions of each subset is divided is displayed, and the properties, tendency and distribution of specified attribute values of a large amount of data are displayed by the bar graph. As described above, the bar graph that represents the properties, tendency and distribution of specified attribute values of the large amount of data can be displayed without requiring the user to perform calculation of the totaling or the like of the large amount of data for the divided display of the bar graph.

In an embodiment of the invention, the division condition relevant to the attribute for dividing each of the subsets into the two regions is a threshold value within a range of a numeric value representing the attribute, and a slider area representing a range and a unit of the threshold value and a position of a slide section arranged on the slider area representing the threshold value are displayed.

According to the above embodiment, each subset is divided into two regions by the threshold value within the range of the numeric value that represents the attribute, and each subset divided into the two regions is displayed in the form of a bar graph. In this stage, the threshold value of the attribute for dividing each subset into the two regions is indicated by the position of the slide portion arranged on the slider area on which the range and unit of the threshold value are indicated. Therefore, the range in which the threshold value (the value of a specified attribute) that characterizes the properties, tendency and distribution of a large amount of data can assume, the relative position of the threshold value in the range and the unit of the threshold value can be easily recognized by the slider area and the slide section.

In an embodiment of the invention, detailed information of elements belonging to either one of the divided two regions of each of the subsets is displayed by a shape that represents a feature of the elements or an attribute that the elements own.

According to the above embodiment, the detailed information of the elements belonging to either one of the divided two regions of the subset is displayed by the shape that represents the feature of the elements. For example, in a bar graph comprised of elements having attributes representing the features of individuals, photographic face images representing the features of the elements are displayed.

Otherwise, the detailed information of elements belonging to either one of the divided two regions of the subset is displayed by an attribute owned by the elements. For example, in a bar graph comprised of a set of elements having the attributes of names, residences, ages and the like representing the features of individuals, the attributes of names, residences, ages and the like are displayed. As described above, by displaying the detailed information of the elements belonging to either one of the divided two regions of the subset, the features of the noticed elements can be easily recognized.

In an embodiment of the invention, the threshold value of the attribute for dividing each of the subsets into the two regions is varied by sliding the slide section on the slider area, each of the subsets is redivided into two regions on the basis of the varied threshold value, and a bar graph of the redivided subsets is redisplayed.

According to the above embodiment, the threshold value of the attribute for dividing the subset into the two regions is varied by sliding the slide section on the slider area. Then, the subset is redivided into two regions on the basis of the varied threshold value, and a bar graph of the redivided subset is redisplayed. Therefore, by the simple operation of sliding the slide section on the slider area, the threshold value (the value of the characteristic attribute) that makes conspicuous the properties, tendency and distribution of a large amount of data can be varied.

In an embodiment of the invention, the threshold value of the attribute for dividing each of the subsets into the two regions is varied by sliding the slide section on the slider area, each of the subsets is redivided into two regions on the basis of the varied threshold value, a bar graph of the redivided subsets is redisplayed, and detailed information of elements belonging to either one of the redivided regions of each of the subsets is displayed by a shape that represents a feature of the elements or an attribute that the elements own.

According to the above embodiment, the threshold value of the attribute for dividing the subset into the two regions is varied by sliding the slide section on the slider area. Then, the subset is redivided into two regions on the basis of the varied threshold value, and a bar graph of the redivided subset is redisplayed. Further, the detailed information of the elements belonging to either one of the redivided regions of the subset is displayed by the shape that represents the features of the elements or an attribute owned by the elements. Therefore, by varying the threshold value (the value of the characteristic attribute) that makes conspicuous the properties, tendency and distribution of a large amount of data through the simple operation of sliding the slide section on the slider area, the state in which the features of the noticed elements change can be easily recognized.

In an embodiment of the invention, the threshold value of the attribute for dividing each of the subsets into the two regions is determined so that the number of elements belonging to either one of the divided two regions of each of the subsets is kept approximately constant.

According to the above embodiment, the threshold value of the attribute for dividing the subset into the two regions is determined so that the number of elements belonging to either one of the divided two regions of the subset is kept approximately constant. Therefore, the threshold value that characterizes the distribution of the specified attribute of a large amount of data can be simply determined through calculation and displayed in a form that allows easy recognition.

In an embodiment of the invention, the threshold value of the attribute for dividing each of the subsets into the two regions is determined so that a ratio of the number of elements belonging to either one of the divided two regions of each of the subsets relative to the number of all the elements of the set is kept approximately constant.

According to the above embodiment, the threshold value of the attribute for dividing the subset into the two regions is determined so that the ratio of the number of elements belonging to either one of the divided two regions of the subset relative to the number of all the elements of the set is kept approximately constant. Therefore, the threshold value that characterizes the distribution of the specified attribute of a large amount of data can be simply determined through calculation and displayed in a form that allows easy recognition.

The present invention also provides a program storage medium that stores a program for implementing the bar graph displaying method stated in any one of the above invention and embodiments.

According to the present invention, the bar graph displaying method of either one of the above invention and embodiments can be stored, transported and circulated by implementing the method not only in the form in which the method is incorporated in a specified one information processing apparatus but also in the form of an independent storage medium obtained by separating a program for executing the bar graph displaying method from the specified one information processing apparatus.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a diagram showing the structure of a comprehensive individual table of the above bar graph display operating system;

FIG. 3 is a diagram showing the structure of a graph display use table of the above bar graph display operating system;

DETAILED DESCRIPTION OF THE PREFERRED EMBODIMENTS

The bar graph displaying method and the program storage medium thereof according to the present invention will be described in detail below on the basis of the embodiments thereof.

(First Embodiment)

Figure 1:
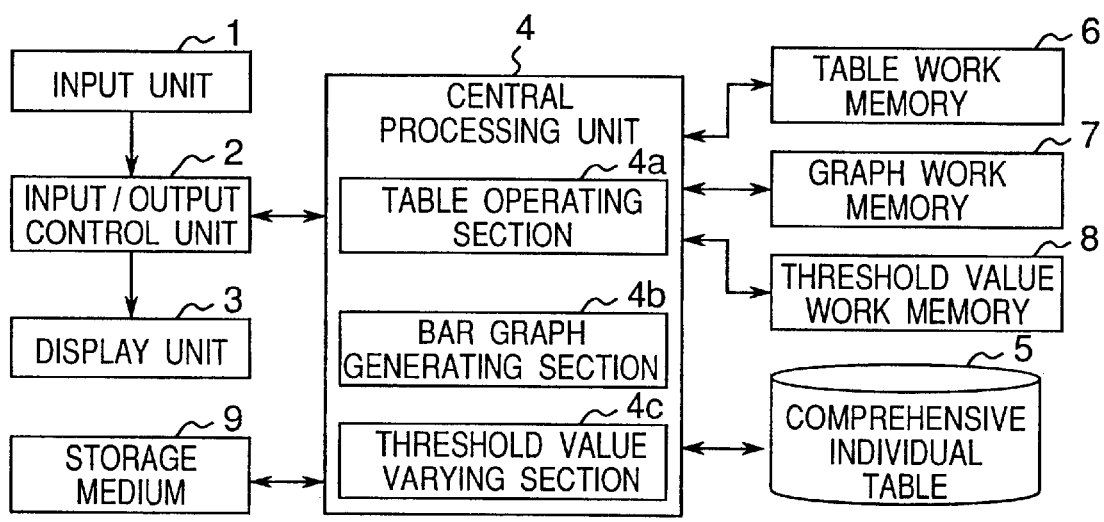
FIG. 1 is a schematic diagram of a bar graph display operating system using a bar graph displaying method according to a first embodiment of the present invention.

FIG. 1 is a schematic view of a bar graph display operating system using a bar graph displaying method according to a first embodiment of the present invention, and this bar graph display operating system is implemented by a personal computer or the like. In FIG. 1 are shown an input unit 1 such as a keyboard and a mouse, an input/output control unit 2 for controlling the input unit 1, a display unit 3 such as a display controlled by the input/output control unit 2, a central processing unit 4 for executing various processing operations on the basis of an input signal and the like inputted from the input unit 1 via the input/output control unit 2, a comprehensive individual table 5 for storing individual information from the central processing unit 4, a table work memory 6 for temporarily storing table information by the central processing unit 4, a graph work memory 7 for storing a graph display use table for generating a bar graph by the central processing unit 4, a threshold value work memory 8 for storing a threshold value to be used for dividing the bar graph by the central processing unit 4 and a storage medium 9 that stores a program to be executed by the central processing unit 4.

The central processing unit 4 has a table 4a operating section 4a for executing an operation on the table stored in the comprehensive individual table 5 or the table work memory 6, a bar graph generating section 4b for generating bar graph data on the basis of the contents of the table work memory 6 and a threshold value varying section 4c that refers to the contents of the threshold value work memory 8 and updates the contents.

FIG. 2 shows the structure of the comprehensive individual table 5. The comprehensive individual table 5 is a table for managing the information relevant to individuals and is constructed of a plurality of records of elements comprised of a name attribute A21, a residence attribute A22 and an age attribute A23. The name attribute A21 represents the name of each subject individual to be identified, the residence attribute A22 represents the residence (Nara Prefecture, Shiga Prefecture, etc.) of each individual, and the age attribute A23 represents the age of each individual. It is to be noted that each record may have another field representing an attribute other than the aforementioned one, as exemplified by an identification number of a photograph image stored in a system.

FIG. 3 shows the structure of the graph display use table stored in the graph work memory 7, and this graph display use table is constructed of a plurality of records comprised of a residence attribute A31, a youth count attribute A32 and an elder count attribute A33. The residence attribute A31 has the same value entry as that of the residence attribute A22 of the comprehensive individual table 5. The youth count attribute A32 stores the number of records of a value being smaller than the threshold value of, for example, 65 of the age attribute A23 (the total number of individuals under age 65) among the records of which the residence attribute in the comprehensive individual table 5 coincides with the residence attribute of the graph display use table. On the other hand, the elder count attribute A33 stores the number of records of a value being not smaller than the threshold value of, for example, 65 of the age attribute A23 (the total number of individuals of age 65 and over) among the records of which the residence attribute in the comprehensive individual table 5 coincides with the residence attribute of the graph display use table.

Figure 4:
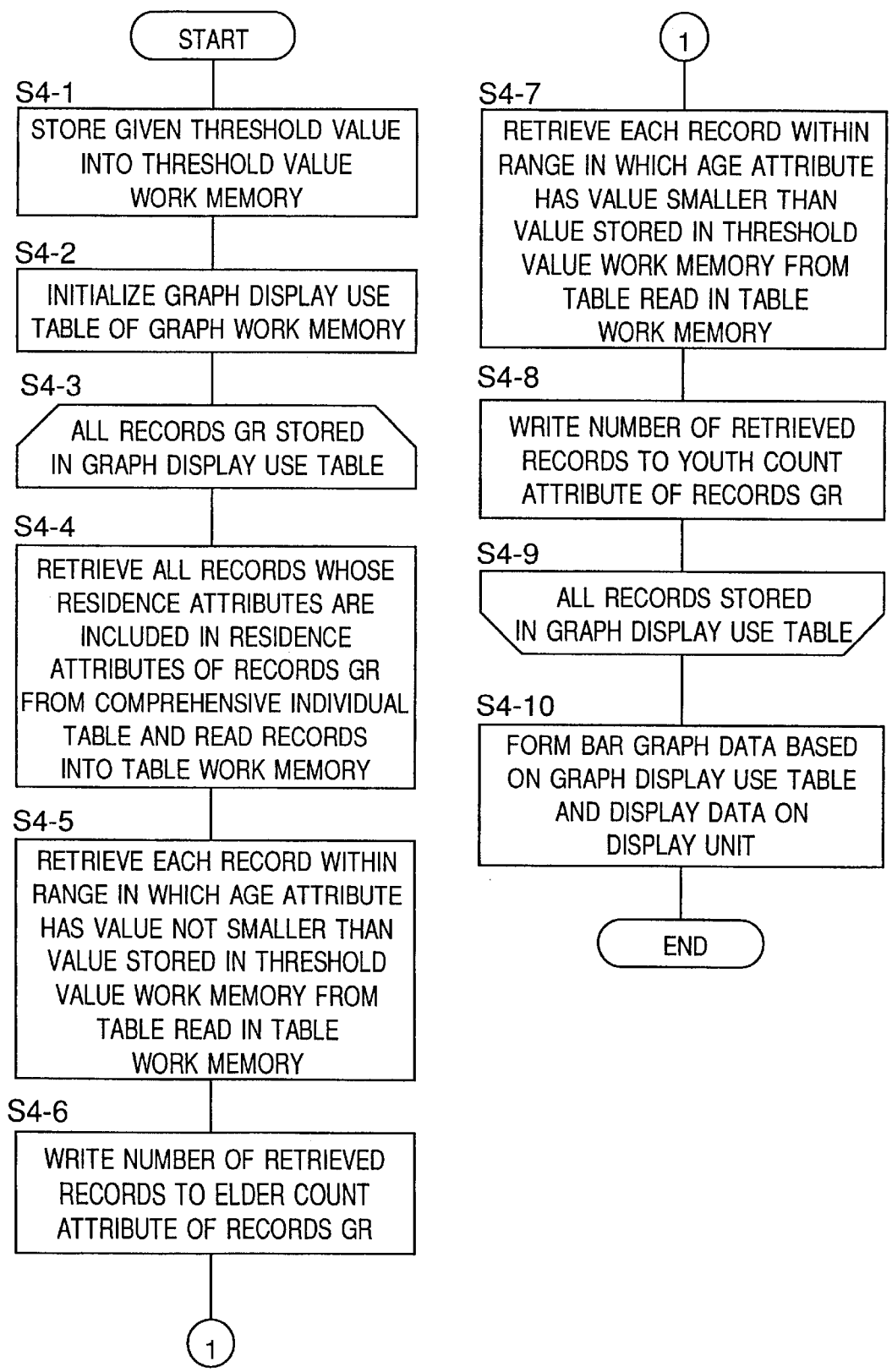
FIG. 4 is a flowchart showing a process for displaying a bar graph of the number of elements of subsets obtained by classifying a set on a certain condition.

FIG. 4 is a flowchart showing the processing of the central processing unit 4 for displaying a bar graph of the number of elements of subsets obtained after the classification of a set into the subsets on a specified condition. The processing of the central processing unit 4 will be described below with reference to FIG. 4.

First, when the processing starts, a given threshold value is stored into the threshold value work memory 8 by the threshold value varying section 4c (S4-1). The threshold value given in this stage may be a value inputted from the input unit 1 or a predetermined value.

Next, the graph display use table of the graph work memory 7 is initialized (S4-2). In the initialized graph display use table, there are records to which the residence attribute A31 has preparatorily been set, and the youth count attribute A32 and the elder count attribute A33 of all the records are set to zero.

Next, the following processes are executed on all the records stored in the graph display use table (S4-3 through S4-9). It is to be noted that the record currently being read is assumed to be GR.

First, records of which the residence attribute A22 is included in the residence attribute A31 of the record GR are all retrieved from the comprehensive individual table 5 and read into the table work memory 6 (S4-4). That is, each record of which the value of the residence attribute A22 coincides with the value of the residence attribute A31 is retrieved from the comprehensive individual table 5 by the table operating section 4a, and the hit (coinciding) records are all stored into the table work memory 6, thereby forming a temporary table having the same structure as that of the comprehensive individual table 5.

Next, each record of which the age attribute A23 has a value not smaller than the value stored in the threshold value work memory 8 is retrieved from the table read in the table work memory 6 (S4-5). That is, each record of which the value of the age attribute A23 is not smaller than the threshold value stored in the threshold value work memory 8 is retrieved from the temporary table formed in the table work memory 6.

Next, the number of retrieved records is written to the elder count attribute A33 of the record GR (S4-6).

Likewise, each record of which the value of the age attribute A23 is smaller than the threshold value stored in the threshold value work memory 8 is retrieved from the temporary table formed in the table work memory 6 (S4-7).

Next, the number of retrieved records is written to the youth count attribute A32 of the record GR (S4-8).

If the above repeating processes (S4-3 through S49) ends, then a bar graph is generated by the bar graph generating section 4b on the basis of the graph display use table and displayed on the display unit 3 (S4-10). Thus, as shown in FIG. 5, the bar graph is displayed on the display unit 3.

Figure 5:
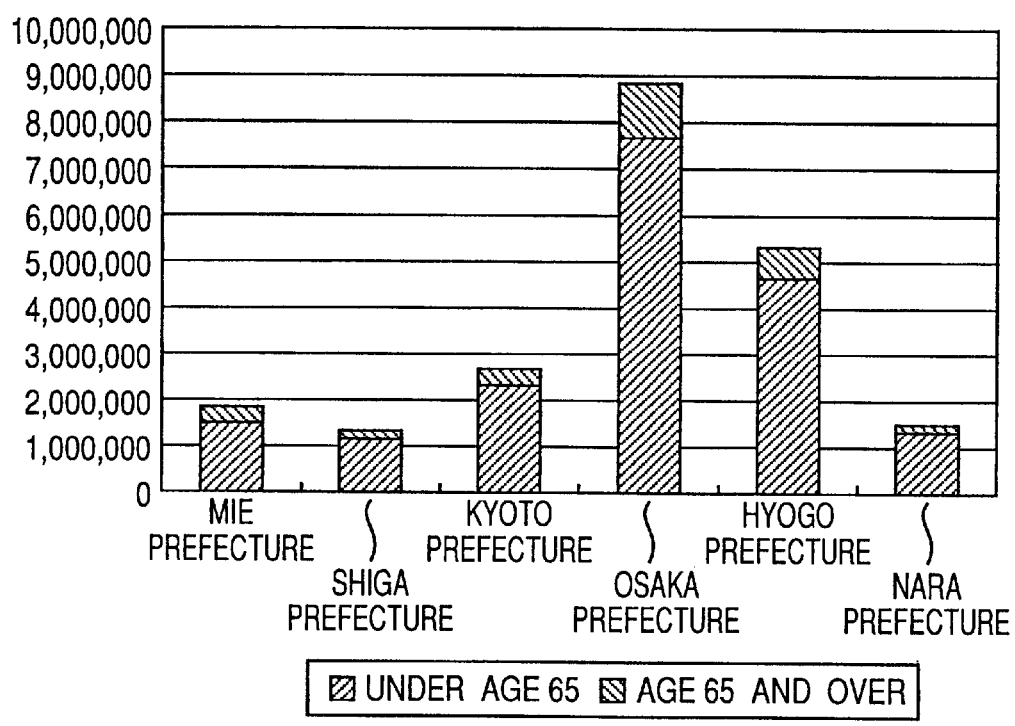
FIG. 5 is a diagram showing a bar graph display of the above bar graph display operating system.

As shown in FIG. 5, the graph display use table of FIG. 3 is formed into the bar graph and displayed on the display unit 3 (shown in FIG. 1). In FIG. 5, the horizontal axis represents the residence, while the vertical axis represents the number of people. The records in the graph display use table are represented by displaying bars of heights proportional to the numbers of youths in the direction of the vertical axis in the positions of residences arranged at regular intervals in the direction of the horizontal axis and displaying bars of heights proportional to the numbers of elders on the above bars. The bars proportional to the numbers of youths and the bars proportional to the numbers of elders are colored differently so as to facilitate identification.

By thus classifying the set of elements having the name attributes, residence attributes and age attributes into subsets having no common portion by the one residence attribute out of the plurality of attributes and setting the division condition relevant to the other age attributes out of the plurality of attributes, the bar graph in which the bar portion corresponding to each subset is divided into two regions can be displayed so that the properties, tendency and distribution of a large amount of data are expressed without requiring the user to perform calculation of the totaling and the like of the large amount of data.

(Second Embodiment)

Figure 6:
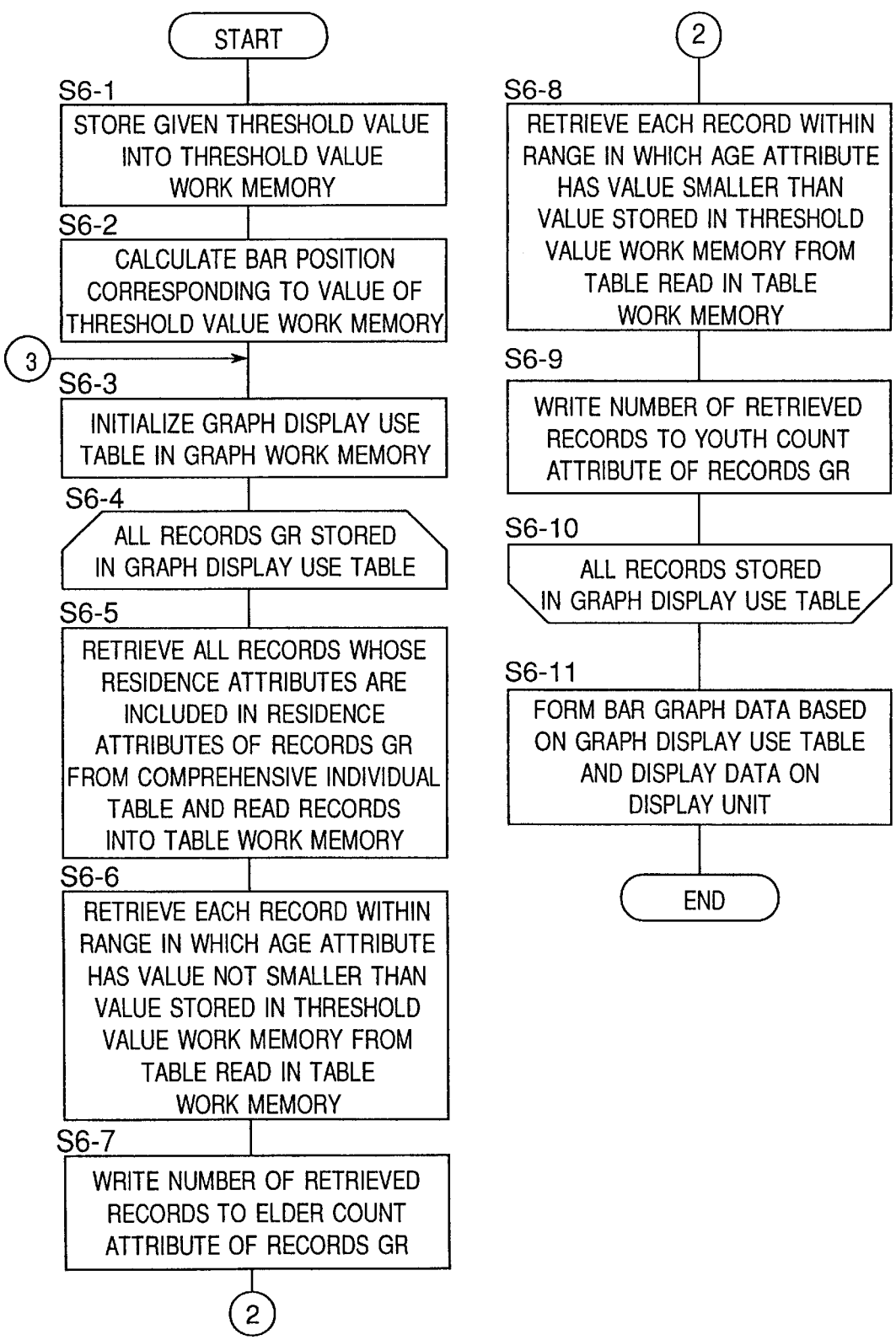
FIG. 6 is a flowchart showing a process for displaying a bar graph, a slider and a bar in a bar graph display operating system using a bar graph displaying method according to a second embodiment of the present invention.

FIG. 6 is a flowchart showing the processing executed by the central processing unit for displaying a bar graph, a slider and a bar in a bar graph display operating system using a bar graph displaying method according to a second embodiment of the present invention. It is to be noted that this bar graph display operating system has the same construction as that of the bar graph display operating system shown in FIG. 1 of the first embodiment. Therefore, see FIG. 1 for the construction.

The processing executed by the central processing unit 4 (shown in FIG. 1) will be described with reference to FIG. 6.

First, when the processing starts, a given threshold value is stored into the threshold value work memory 8 by the threshold value varying section 4c (S6-1). The threshold value given in this stage may be a value inputted from the input unit 1 or a predetermined value.

Figure 7:
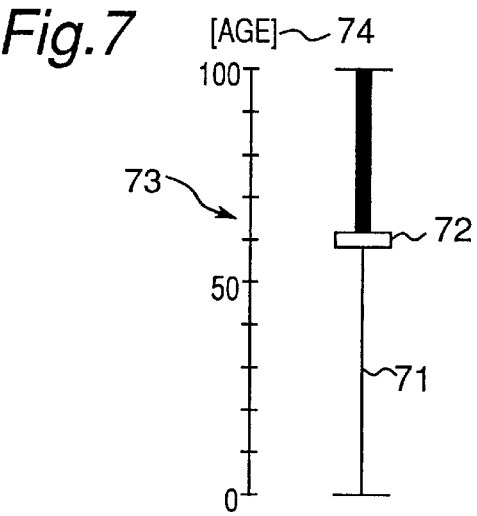
FIG. 7 is a diagram showing the display of a slider and a bar of the above bar graph display operating system.

Next, the position of a bar 72 of a slider 71 is calculated in correspondence with the value of the threshold value work memory 8 and then displayed (S6-2). As shown in FIG. 7, the slider 71 and the bar 72 are displayed on the display unit 3 (shown in FIG. 1), and the bar 72 can be slid between the upper end and the lower end of the slider 71 by the mouse (not shown) or the like of the input unit 1. A value within a range in which the attribute value can assume can be expressed by the position of the bar 72 on the slider 71. For example, assuming that the length from the upper end to the lower end of the slider 71 is L1 and the length from the lower end of the slider 71 to the bar 72 is L2, then the attribute value can be represented by a value within a range of 0 to 100 by calculating the value of (L2/L1×100). The attribute value becomes zero when the bar 72 is located at the lower end of the slider 71, and the attribute value becomes 100 when the bar 72 is located at the upper end of the slider 71. The value represented by the bar 72 is used as the threshold value for calculating the value of the youth count attribute and the elder count attribute in the graph display use table. It is to be noted that a scale 73 that ranges from zero to 100 is displayed on the left-hand side of the slider 71 in FIG. 7, and a threshold value unit of 74 (age) is displayed on the upper side of the scale. Assuming that this threshold value is T and the length from the upper end to the lower end of the slider 71 is L1, then the position of the bar 72 on the slider 71 can be practically calculated by displaying the bar 72 in the position (L1×T/100) above the lower end of the slider 71.

Then, the subsequent processes from S6-3 to S6-11 are the processes for displaying the bar graph, and are executed in quite the same manner as those in S4-2 to S4-10 shown in FIG. 4 of the first embodiment, and therefore, no description is provided therefor.

Figure 8:
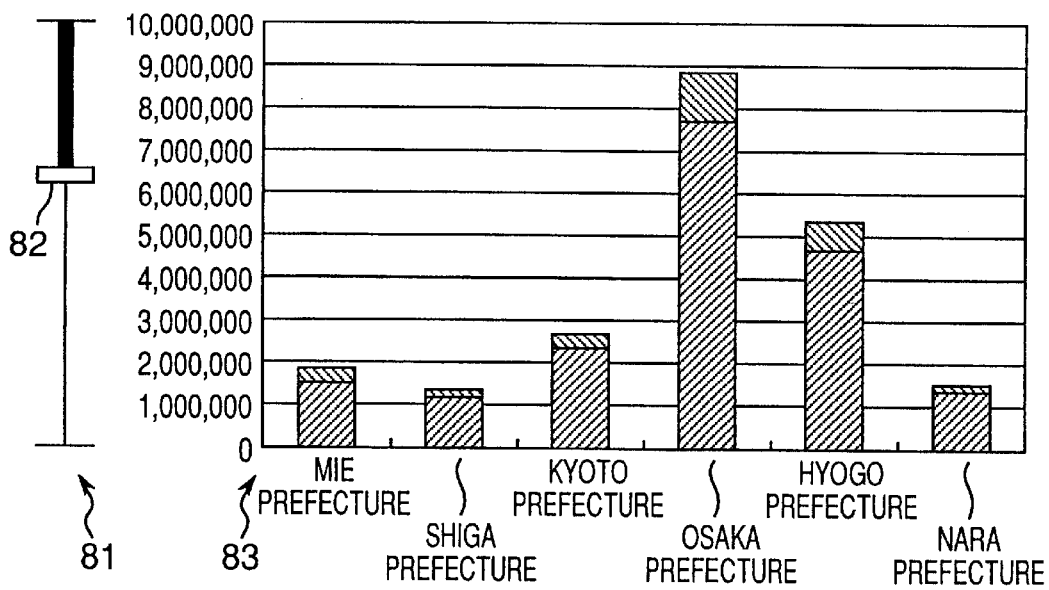
FIG. 8 is a diagram showing the display of the bar graph and the slider of the above bar graph display operating system.

Thus, as shown in FIG. 8, a bar graph 83 similar to that of FIG. 5 and a slider 81 and a bar 82 similar to those of FIG. 7 are displayed on the display unit 3. The above bar graph 83 is obtained by classifying a set into a subsets by a certain attribute and displaying the number of elements of the subsets in the form of a bar graph, where the bar 82 is displayed in a position on the slider 81 corresponding to the threshold value of the age attribute A23 used in dividing the subsets by the residence. It is to be noted that neither scale nor unit is shown in FIG. 8.

As described above, the range in which the threshold value of the attribute for dividing each subset into the two regions can assume, the relative position of the threshold value in the range and the unit of the threshold value are represented by the position of the bar 82 arranged on the slider 81 where the range and unit of the threshold value are indicated. Therefore, the threshold value (the value of a specified attribute) that characterizes the properties, tendency and distribution of a large amount of data can be easily recognized.

(Third Embodiment)

Figure 9:
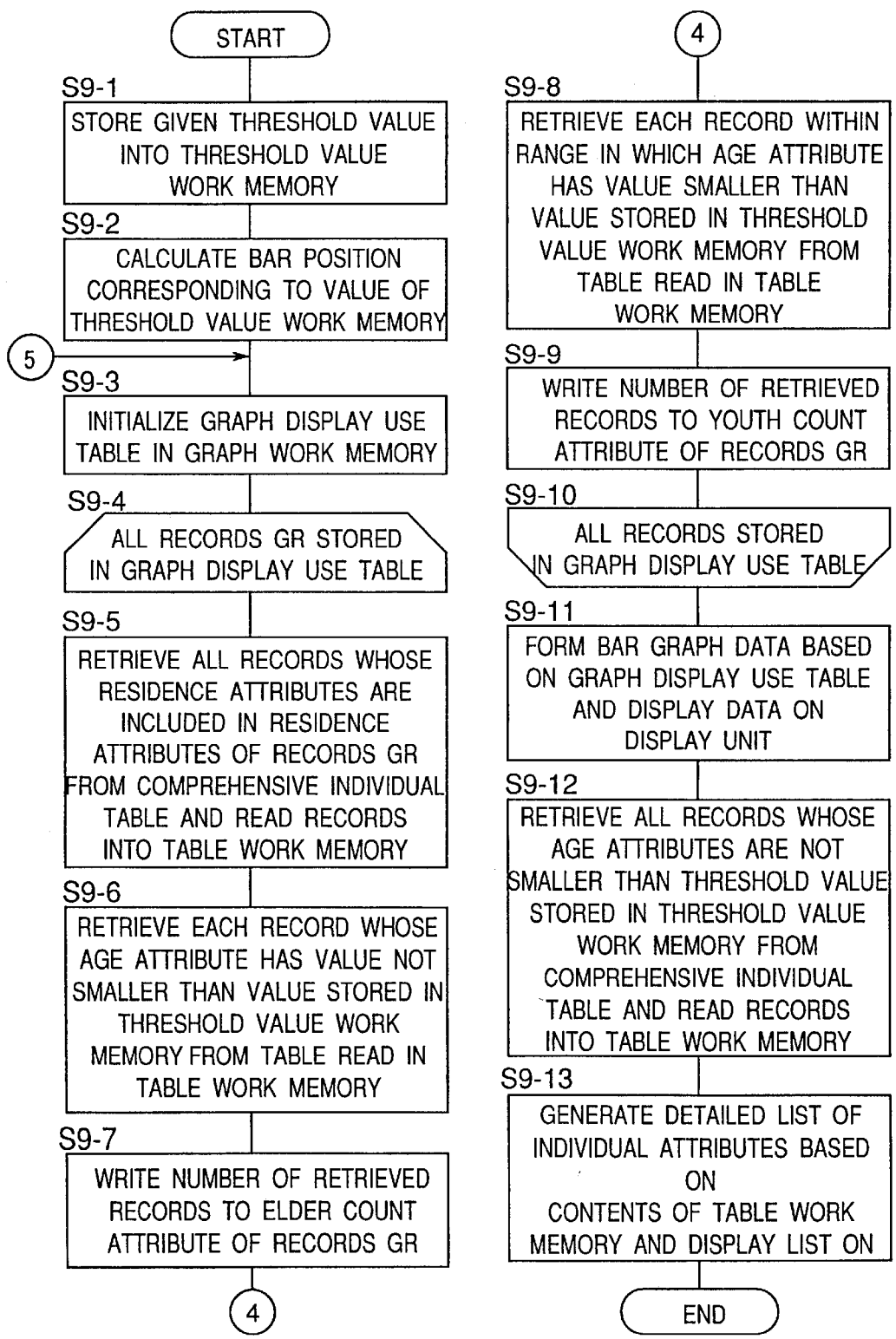
FIG. 9 is a flowchart showing a process for dividing each subset into two regions by a threshold value designated by the slider and the bar, displaying a bar graph and listing the details of elements belonging to one region of the divided two regions of each subset in a bar graph display operating system using a bar graph displaying method according to a third embodiment of the present invention.

FIG. 9 is a flowchart executed by the central processing unit showing a process for dividing each subset into two regions by a threshold value designated by a slider and a bar, displaying a bar graph of the number of elements of each subset and listing the details of elements belonging to one region of the divided two regions of each subset in a bar graph display operating system using a bar graph displaying method according to a third embodiment of the present invention. It is to be noted that this bar graph display operating system has the same construction as that of the bar graph display operating system shown in FIG. 1 of the first embodiment. Therefore, see FIG. 1 for the construction.

In FIG. 9, the processes from S9-1 to S9-11 are quite the same manner as those in S6-1 to S6-11 for displaying the slider, bar and bar graph in the second embodiment, and therefore, no description is provided therefor.

Subsequent to S9-1 through S9-11, each record of which the age attribute is not smaller than the threshold value stored in the threshold value work memory 8 is retrieved from the comprehensive individual table 5 and read into the table work memory 6 (S9-12).

Then, a detailed list 104 of the individual attributes is generated on the basis of the contents of the table work memory 6 and displayed on the display unit 3 (S9-13).

Figure 10:
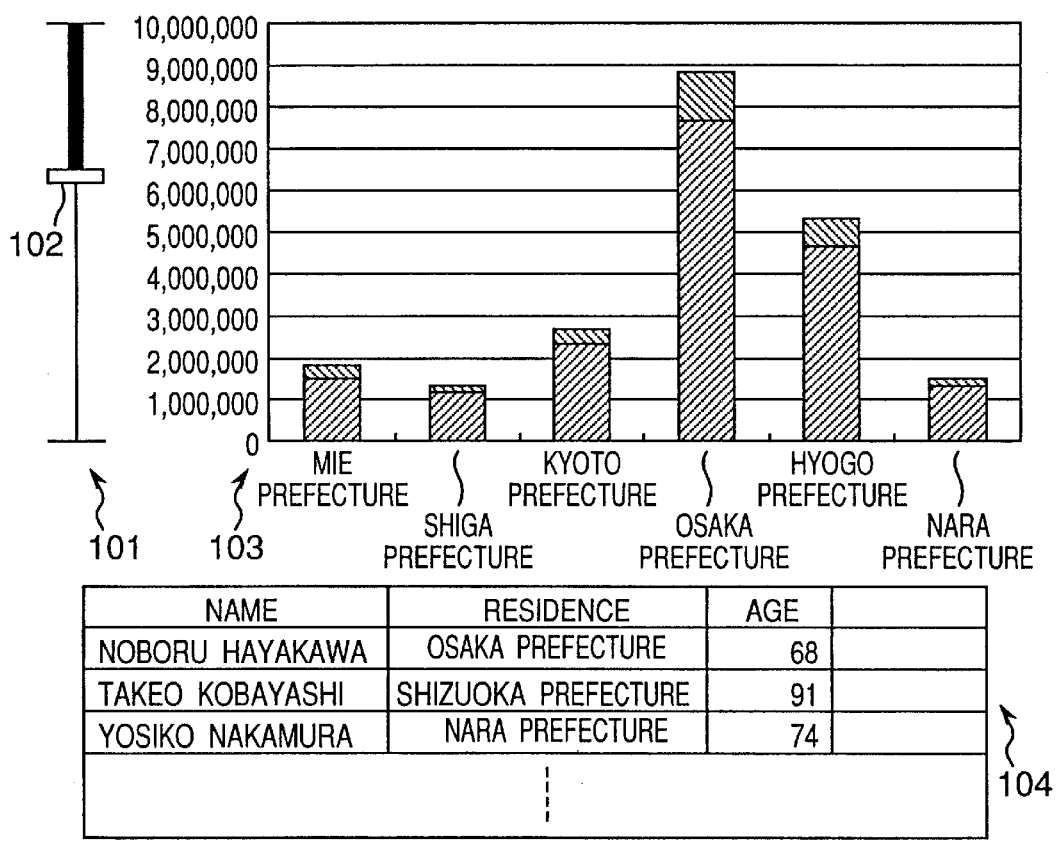
FIG. 10 is a graph showing the display of the bar graph, the slider and the element list of the above bar graph display operating system.

FIG. 10 shows the contents of display of a bar graph 103 and the detailed list 104 on the display unit 3, where the reference numerals 101 and 102 denote a slider and a bar similar to those shown in FIG. 7, and the reference numeral 103 denotes a bar graph similar to the bar graph shown in FIG. 5. The detailed list 104 that lists the individual attributes higher than the threshold value for dividing the subset into the two regions is displayed in the form of a table on the lower side of the bar graph 103. One row of this detailed list 104 is one record that represents the individual attributes, and the attributes of the name, residence and age are displayed in each row. It is to be noted that neither scale nor unit is shown in FIG. 10.

As described above, by displaying the detailed information (detailed list 104) of the elements that belongs to either one of the divided two regions of each subset, the features of each noticed element can be easily recognized.

Although the detailed list 104 that lists the attributes owned by the individual records greater than the threshold value for dividing each subset is displayed in the form of the table together with the bar graph 103 in the third embodiment, it is acceptable to display the detailed list that lists the attributes owned by the individual records smaller than the threshold value for dividing each subset is displayed in the form of the table. The detailed list 104 may otherwise be displayed in the form of a shape representing the features such as the photographic face images or the like of the above elements, the shape being able to be displayed by another attribute included in the comprehensive individual table 5.

(Fourth Embodiment)

Figure 11:
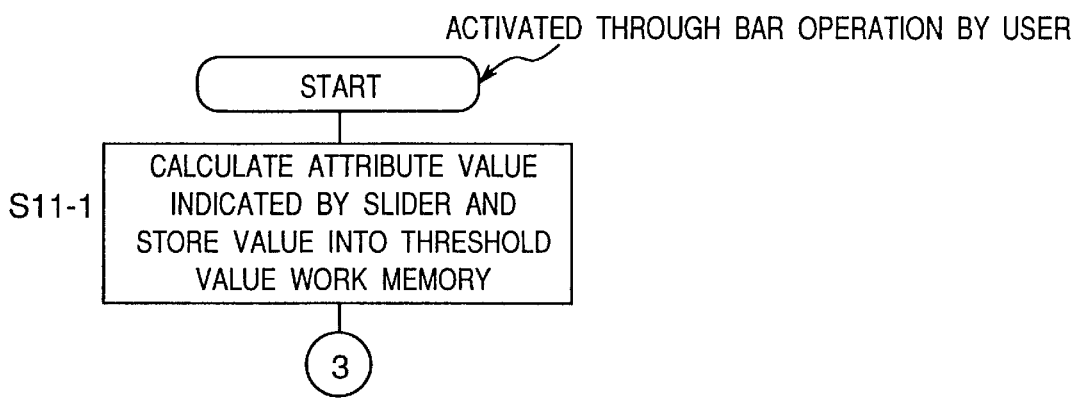
FIG. 11 is a flowchart showing a process for dividing each subset into two regions by a threshold value designated by the slider and the bar and displaying a bar graph in a bar graph display operating system using a bar graph displaying method according to a fourth embodiment of the present invention.

FIG. 11 is a flowchart showing a process for classifying a set into subsets by a threshold value designated by a slider and a bar and displaying a bar graph of the number of elements of the subsets in a bar graph display operating system using a bar graph displaying method according to a fourth embodiment of the present invention. It is to be noted that this bar graph display operating system has the same construction as that of the bar graph display operating system shown in FIG. 1 of the first embodiment. Therefore, see FIG. 1 for the construction.

If the processing of this flowchart is started through excitation when the user operates the bar 82 in the state in which the slider and the bar graph are displayed as described with reference to FIG. 8, then the attribute value indicated by the slider 81 is calculated and stored into the threshold value work memory 8 (S11-1). That is, the threshold value is calculated from the position of the bar 82 on the slider 81 according to the method described in connection with the third embodiment, and the threshold value is stored into the threshold value work memory 8 by the threshold value varying section 4c.

Subsequently, the processes from S6-3 to S6-11 of FIG. 6 are executed, thereby redisplaying a bar graph on the display unit 3.

If the threshold value of the attribute for dividing each subset into the two regions by thus sliding the bar 82 on the slider 81, then each subset is redivided into two regions on the basis of the varied threshold value, and the bar graph of the redivided subsets is redisplayed. Therefore, the threshold value (the value of the characteristic attribute) that makes conspicuous the properties, tendency and distribution of a large amount of data can be varied.

(Fifth Embodiment)

Figure 12:
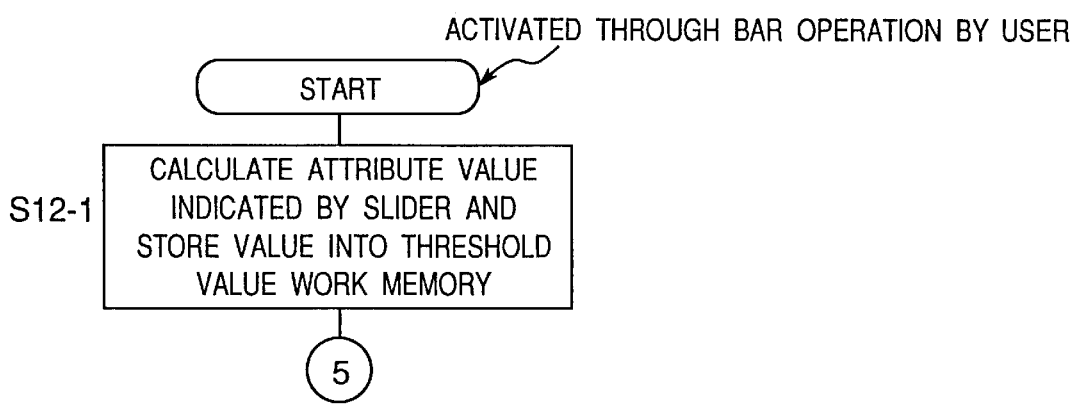
FIG. 12 is a flowchart showing a process for dividing each subset by a threshold value designated by the slider and the bar, displaying a bar graph and listing the details of elements belonging to one region of the divided two regions of each subset in a bar graph display operating system using a bar graph displaying method according to a fifth embodiment of the present invention.

FIG. 12 is a flowchart showing a process executed by the central processing unit dividing each subset into two regions by a threshold value designated by the slider and the bar, displaying a bar graph of the number of elements of the subsets and listing the details of elements belonging to either one of the divided two regions of each subset in a bar graph display operating system using a bar graph displaying method according to a fifth embodiment of the present invention. It is to be noted that this bar graph display operating system has the same construction as that of the bar graph display operating system shown in FIG. 1 of the first embodiment. Therefore, see FIG. 1 for the construction.

If the processing of this flowchart is started through excitation when the user operates the bar 102 in the state in which the slider and the bar graph are displayed as described with reference to FIG. 10 of the third embodiment, then the attribute value represented by the slider 101 is calculated and stored into the threshold value work memory 8 (S12-1). That is, the threshold value is calculated from the position of the bar 102 according to the method described in connection with the third embodiment, and the threshold value is stored into the threshold value work memory 8 by the threshold value varying section 4c.

Subsequently, the processes from S9-3 to S9-13 of FIG. 9 are executed, and the bar graph 103 and the detailed list 104 that lists the element list are redisplayed on the display unit 3 as shown in FIG. 10.

If the threshold value of the attribute for dividing each subset into the two regions is varied by thus sliding the bar 102 on the slider 101, then each subset is redivided into two regions on the basis of the varied threshold value, and the bar graph of the redivided subsets is redisplayed. Together with this operation, the detailed information of the elements belonging to one region of each redivided subset is displayed by the detailed list 104. Therefore, by varying the threshold value (the value of the characteristic attribute) that makes conspicuous the properties, tendency and distribution of a large amount of data, the state in which the noticed element changes can be easily recognized.

(Sixth Embodiment)

Figure 13:
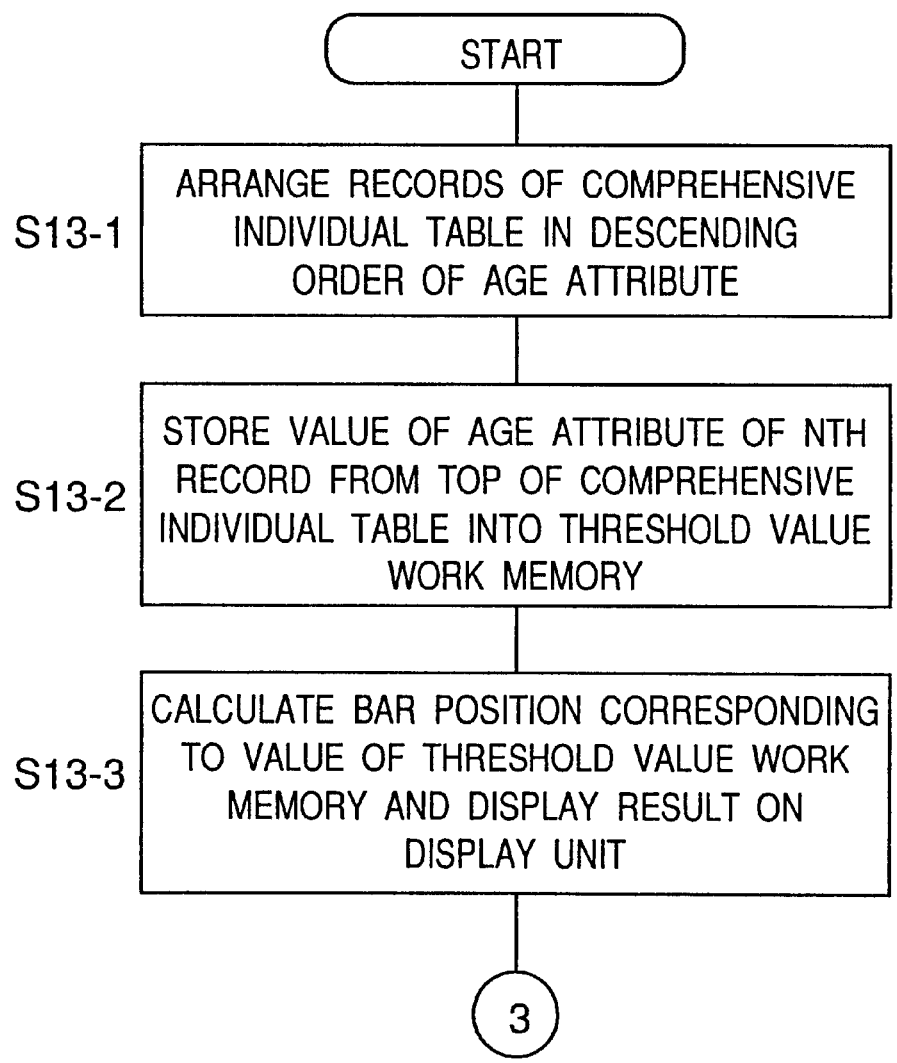
FIG. 13 is a flowchart showing a process for automatically setting a threshold value so that the number of elements belonging to either one of the divided two regions of each subset is kept constant in a bar graph display operating system using a bar graph displaying method according to a sixth embodiment of the present invention.

FIG. 13 is a flowchart showing a process for automatically setting the threshold value so that the number of elements belonging to either one of the divided two regions is kept constant in a bar graph display operating system using a bar graph displaying method according to a sixth embodiment of the present invention. It is to be noted that this bar graph display operating system has the same construction as that of the bar graph display operating system shown in FIG. 1 of the first embodiment. Therefore, see FIG. 1 for the construction.

A process for setting the threshold value so as to keep at N the number of records of which the age attribute A23 is not smaller than a specified threshold value out of the records stored in the comprehensive individual table 5 will be described here. In this case, the value of N may be a value inputted by the input unit 1 or a predetermined value.

First, when the processing starts, the records of the comprehensive individual table 5 are arranged in the descending order of the age attribute A23 (S13-1).

Next, the age attribute A23 of the Nth record from the top of the comprehensive individual table 5 is stored into the threshold value work memory 8 by the threshold value varying section 4c (S13-2).

Next, the position of the bar 72 is calculated in correspondence with the value of the threshold value work memory 8 and displayed on the display unit 3 (S13-3). The practical calculating method of the position of the bar 72 on the slider 71 is similar to the method described in S6-2 of FIG. 6 of the second embodiment.

Subsequently, the processes from S6-3 to S6-11 of FIG. 6 are executed, and a bar graph is redisplayed.

As described above, the threshold value is determined so that the number of elements belonging to one region of the divided two regions of each subset is kept approximately constant. Therefore, the threshold value that characterizes the distribution of the specified attribute of a large amount of data can be simply determined through calculation and displayed in a form that allows easy recognition.

(Seventh Embodiment)

Figure 14:
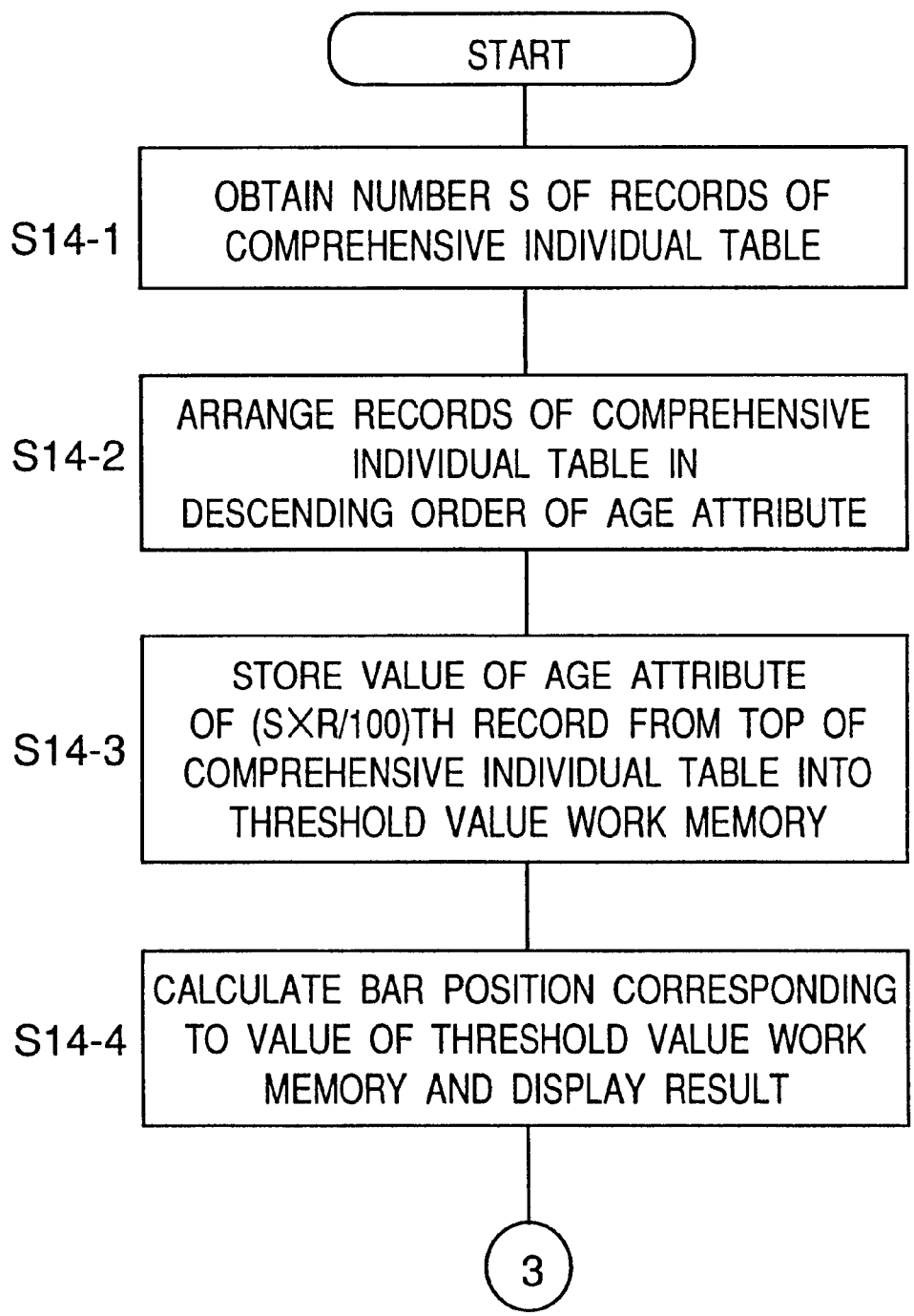
FIG. 14 is a flowchart showing a process for automatically setting a threshold value so that the ratio of the number of elements belonging to either one of the divided two regions of each subset relative to the number of all the elements is kept constant in a bar graph display operating system using the bar graph displaying method according to a seventh embodiment of the present invention.
Figures 15, 16:
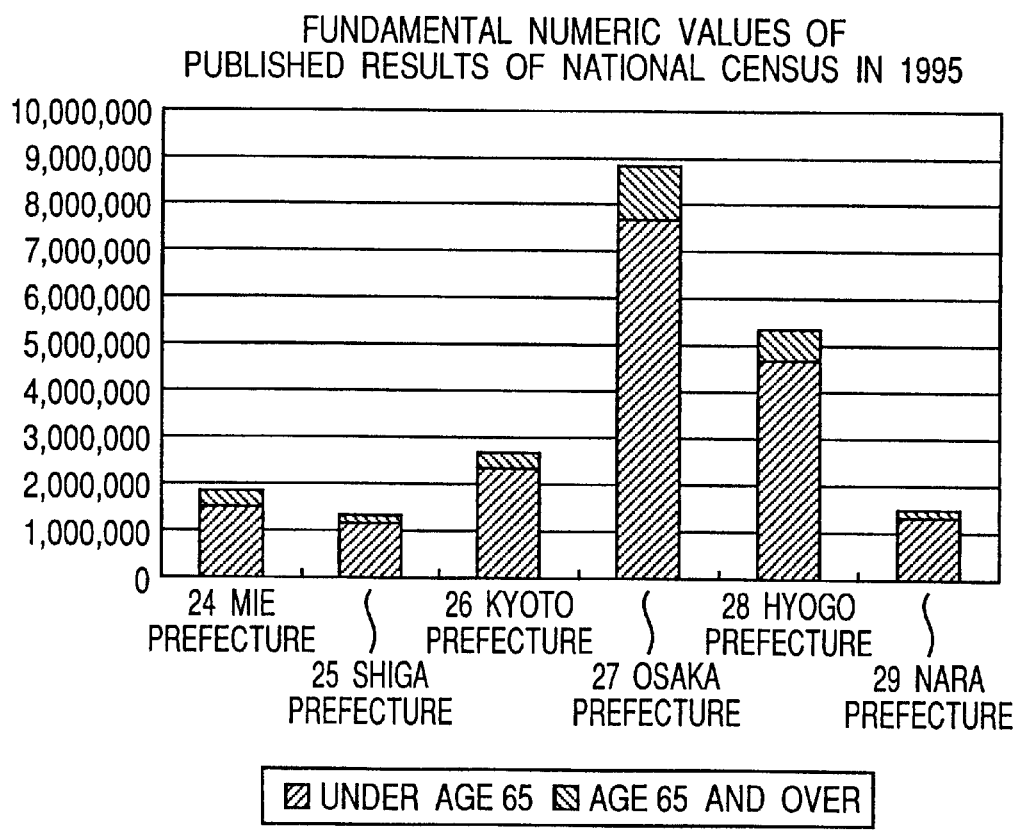
FIG. 15 is a table showing the results of a national census with regard to an age group under 65 and an age group of 65 and over.
FIG. 16 is a bar graph display of the age group under 65 and the age group of 65 and over.
Figures 17, 18:
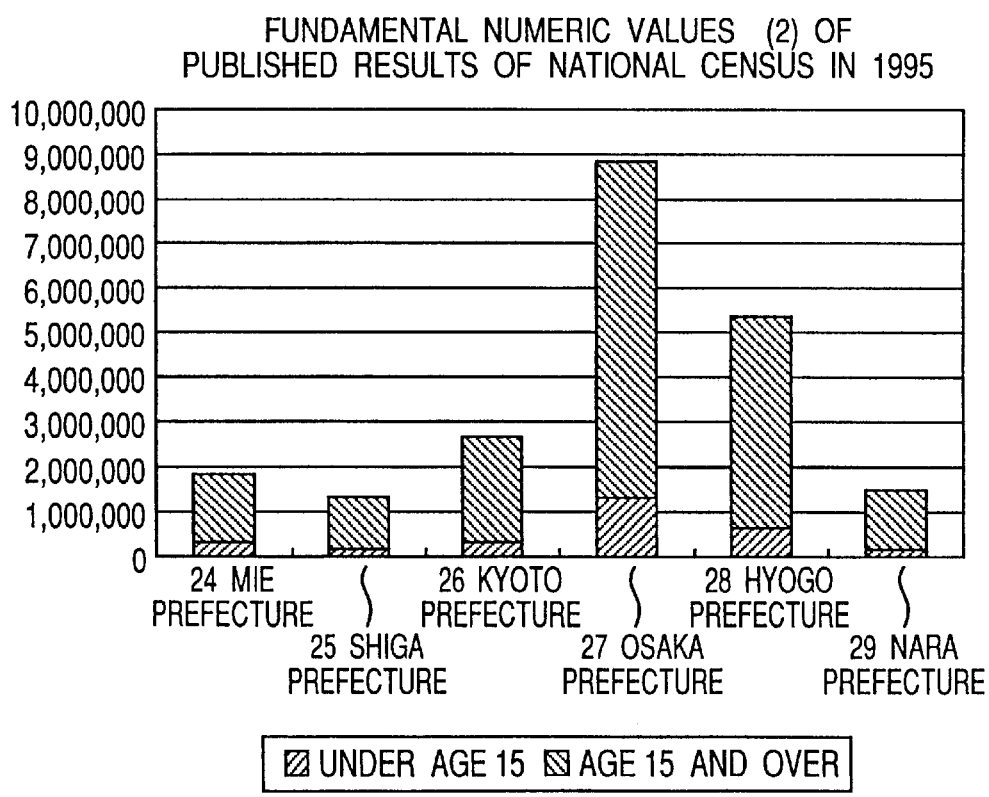
FIG. 17 is a table showing the results of a national census of an age group under 15 and an age group of 15 and over.
FIG. 18 is a bar graph display of the age group under 15 and the age group of 15 and over.

FIG. 14 is a flowchart showing a process for automatically setting the threshold value so that the ratio of the number of elements belonging to either one of the divided two regions of each subset relative to the number of all the elements is kept approximately constant in a bar graph display operating system using the bar graph displaying method according to a seventh embodiment of the present invention. It is to be noted that this bar graph display operating system has the same construction as that of the bar graph display operating system shown in FIG. 1 of the first embodiment. Therefore, see FIG. 1 for the construction.

A process for setting the threshold value so as to kept at R % the ratio of the number of records of which the age attribute A23 is not smaller than a specified threshold value relative to all the number of records registered in the comprehensive individual table 5 will be described here. In this case, the value of R may be a value inputted by the input unit 1 or a predetermined value.

First, when the processing starts, the number S of records of the comprehensive individual table 5 is obtained (S14-1).

Next, the records of the comprehensive individual table 5 are arranged in the descending order of the age attribute A23 (S14-2).

Next, the age attribute A23 of the (S×R/100)th record from the top of the comprehensive individual table 5 is stored into the threshold value work memory 8 by the threshold value varying section 4c (S14-3).

Next, the position of the bar 72 is calculated in correspondence with the value of the threshold value work memory 8 and displayed on the display unit 3 (S14-4). The practical calculating method of the position of the bar 72 on the slider 71 is similar to the method described in S6-2 of FIG. 6 of the second embodiment.

Subsequently, the processes from S6-3 to S6-11 shown in FIG. 6 are executed, and a bar graph is redisplayed.

As described above, the threshold value is determined so that the ratio of the number of elements belonging to one region of the divided two regions of each subset relative to the number of all the elements is kept approximately constant. Therefore, the threshold value that characterizes the distribution of the specified attribute of a large amount of data can be simply determined through calculation and displayed in a form that allows easy recognition.

The statistical data of the information of individuals has been described as a set of elements having a plurality of attributes in the first through seventh embodiments. However, the present invention can, of course, be applied to the statistical data of other information such as the information of financial affairs as the set of elements having a plurality of attributes.

The set of the records that serve as the elements comprised of the name attribute A21, residence attribute A22 and age attribute A23 has been described in the first through seventh embodiments. However, the present invention is not limited to these element attributes and may be applied to a set of elements having a variety of attributes. In this case, an attribute represented by a numeric value or threshold value of an attribute that can be represented by a numeric value is used as a division condition.

The bar graph display operating system in which the program for controlling the central processing unit 4 is stored in the storage medium 9 has been described in the first through seventh embodiments. However, it is acceptable to store part or the whole of the program of the present invention into a program storage medium such as a floppy disk and execute the program by reading the program into an information processing apparatus such as a personal computer as the occasion demands.

The invention being thus described, it will be obvious that the same may be varied in many ways. Such variations are not be regarded as a departure from the sprit and scope of the invention, and all such modifications as would be obvious to one skilled in the art are intended to be included within the scope of the following claims.

What is claimed is:

1. A bar graph displaying method for classifying a set of elements having a plurality of attributes into subsets by one attribute among the plurality of attributes, the subsets having no common part, and displaying the number of elements of the subsets in the form of a bar graph, comprising the steps of:

dividing each of the subsets into two regions on the basis of a more detailed division condition relevant to the attribute used for classifying the set into the subsets or a division condition relevant to another attribute among the plurality of attributes;

displaying a bar graph in which a bar portion corresponding to each of the subsets is divided; and wherein the division condition relevant to the attribute for dividing each of the subsets into the two regions is a threshold value within a range of a value representing the attribute.

2. A program storage medium that stores a program for implementing the bar graph displaying method claimed in claim 1.

3. A bar graph displaying method for classifying a set of elements having a plurality of attributes into subsets by one attribute among the plurality of attributes, the subsets having no common part, and displaying the number of elements of the subsets in the form of a bar graph, comprising the steps of:

dividing each of the subsets into two regions on the basis of a more detailed division condition relevant to the attribute used for classifying the set into the subsets or a division condition relevant to another attribute among the plurality of attributes;

displaying a bar graph in which a bar portion corresponding to each of the subsets is divided; wherein:

the division condition relevant to the attribute for dividing each of the subsets into the two regions is a threshold value within a range of a numeric value representing the attribute, and a slider area representing a range and a unit of the threshold value and a position of a slide section arranged on the slider area representing the threshold value are displayed.

4. A bar graph displaying method as claimed in claim 3, wherein detailed information of elements belonging to either one of the divided two regions of each of the subsets is displayed by a shape that represents a feature of the elements or an attribute that the elements own.

5. A bar graph displaying method as claimed in claim 3, wherein the threshold value of the attribute for dividing each of the subsets into the two regions is varied by sliding the slide section on the slider area, each of the subsets is redivided into two regions on the basis of the varied threshold value, and a bar graph of the redivided subsets is redisplayed.

6. A bar graph displaying method as claimed in claim 3, wherein the threshold value of the attribute for dividing each of the subsets into the two regions is varied by sliding the slide section on the slider area, each of the subsets is redivided into two regions on the basis of the varied threshold value, a bar graph of the redivided subsets is redisplayed, and detailed information of elements belonging to either one of the redivided regions of each of the subsets is displayed by a shape that represents a feature of the elements or an attribute that the elements own.

7. A bar graph displaying method as claimed in claim 3, wherein the threshold value of the attribute for dividing each of the subsets into the two regions is determined so that the number of elements belonging to either one of the divided two regions of each of the subsets is kept approximately constant.

8. A bar graph displaying method as claimed in claim 3, wherein the threshold value of the attribute for dividing each of the subsets into the two regions is determined so that a ratio of the number of elements belonging to either one of the divided two regions of each of the subsets relative to the number of all the elements of the set is kept approximately constant.

9. A program storage medium that stores a program for implementing the bar graph displaying method claimed in any one of claims 4–8.

10. A program storage medium that stores a program for implementing the bar graph displaying method claimed in claim 3.

11. A bar graph displaying method comprising the steps of:

classifying a set of elements having a plurality of attributes into subsets by one attribute among the plurality of attributes, the subsets having no common part; and displaying the number of elements of the subsets in the form of a bar graph including one or more bar portions, one for each subset, said displaying including:

dividing each of the subsets into two regions on the basis of a more detailed division condition relevant to the attribute used for classifying the set into the subsets or a division condition relevant to another attribute among the plurality of attributes, retrieving records of each element in each of the two regions of each of the subsets, and dividing the bar portion for each of the subsets based on information determined from said retrieving records of each element in each of the two regions.

12. A bar graph displaying method as claimed in claim 11, wherein said dividing includes:

determining a number of records retrieved in each of the two regions of each of the subsets, and dividing the bar portion for each of the subsets based on the number or records retrieved in each of the two regions of each of the subsets.

13. A bar graph displaying method as claimed in either of claims 11 or 12, wherein said displaying further includes setting a threshold value within a range of a numeric value representing the attribute as the division condition relevant to the attribute for dividing each of the subsets into the two regions.

14. A bar graph displaying method as claimed in claim 13, wherein said displaying further includes displaying a slider area representing a range and a unit of the threshold value and a position of a slide section arranged on the slider area representing the threshold value.

15. A bar graph displaying method as claimed in claim 11, wherein said displaying further includes performing said dividing of each of the subsets and said retrieving for all subsets before the bar graph is displayed.

* * * * *

UNITED STATES PATENT AND TRADEMARK OFFICE
CERTIFICATE OF CORRECTION

PATENT NO. : 6,429,869 B1
DATED : August 6, 2002
INVENTOR(S) : Kamakura et al.

It is certified that error appears in the above-identified patent and that said Letters Patent is hereby corrected as shown below:

<u>Title page,</u>
Item [73], Assignee, change "Sharp Kabusshiki Kaisha" to
-- Sharp Kabushiki Kaisha --.

Signed and Sealed this

Eleventh Day of February, 2003

JAMES E. ROGAN
*Director of the United States Patent and Trademark Office*